(12) United States Patent
Liu et al.

(10) Patent No.: US 12,476,536 B2
(45) Date of Patent: Nov. 18, 2025

(54) MULTI-MODE PFC CIRCUIT AND CONTROL METHOD THEREOF

(71) Applicant: Chengdu Monolithic Power Systems Co., Ltd., Chengdu (CN)

(72) Inventors: Pengfei Liu, Hangzhou (CN); Hao Wang, Hangzhou (CN); Chuanhao Xu, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 219 days.

(21) Appl. No.: 18/487,362

(22) Filed: Oct. 16, 2023

(65) Prior Publication Data

US 2024/0055983 A1 Feb. 15, 2024

(30) Foreign Application Priority Data

Nov. 2, 2022 (CN) .......................... 202211366297.4

(51) Int. Cl.
*H02M 1/42* (2007.01)
*H02M 1/00* (2006.01)

(52) U.S. Cl.
CPC ....... *H02M 1/4225* (2013.01); *H02M 1/0009* (2021.05); *H02M 1/42* (2013.01); *H02M 1/4208* (2013.01)

(58) Field of Classification Search
CPC .... H02M 1/4225; H02M 1/42; H02M 1/4208; H02M 1/0009; Y02B 70/10
See application file for complete search history.

(56) References Cited

U.S. PATENT DOCUMENTS

| | | | |
|---|---|---|---|
| 9,444,327 B2 | 9/2016 | Lin | |
| 9,479,046 B2* | 10/2016 | Lin | H02M 1/4225 |
| 10,734,888 B1* | 8/2020 | Halberstadt | H02M 1/4225 |
| 10,855,171 B2 | 12/2020 | Lu | |
| 2012/0014148 A1* | 1/2012 | Li | H02M 1/4225 363/78 |
| 2015/0303790 A1* | 10/2015 | Lin | H02M 1/4225 363/89 |
| 2020/0244159 A1* | 7/2020 | Lu | H02M 1/4225 |
| 2023/0163679 A1 | 5/2023 | Li et al. | |
| 2024/0275273 A1* | 8/2024 | Li | H02M 1/4225 |

* cited by examiner

*Primary Examiner* — Monica Lewis
*Assistant Examiner* — Jye-June Lee
(74) *Attorney, Agent, or Firm* — Perkins Coie LLP

(57) ABSTRACT

A power factor control circuit for controlling a PFC circuit is disclosed. The PFC circuit is controlled to operate in one or more operation mode(s) (e.g., CCM, BCM, and DCM) in a single cycle of an input rectified voltage based on a load condition of the PFC circuit. The power factor control circuit includes a control reference circuit and a switching control circuit. The control reference circuit provides a peak current signal, a valley current signal and a turn-on delay signal based on a first current reference, a second current reference, and an input average current. The switching control circuit provides a switching control signal to control a dominant power switch of the PFC circuit based on a current sense signal, the peak current signal, the valley current signal, and the turn-on delay signal.

20 Claims, 5 Drawing Sheets

MULTI-MODE PFC CIRCUIT AND CONTROL METHOD THEREOF

CROSS-REFERENCE TO RELATED APPLICATIONS

This application claims priority to and the benefit of Chinese Patent Application No. 202211366297.4, filed on Nov. 2, 2022, which is incorporated herein by reference in its entirety.

TECHNICAL FIELD

The present invention relates generally to electronic circuits, and more particularly but not exclusively to PFC (Power Factor Correction) circuit and control method thereof.

BACKGROUND OF THE INVENTION

PFC circuits are widely adopted by power converter systems, for regulating a phase of an input current to improve a power factor of the system, so as to reduce power dissipation.

Commonly, a rectified voltage is obtained by rectifying an AC voltage having a sine wave, and is provided to the PFC circuit as a power supply voltage. To realize PFC control, a waveform and a phase of an input current Iin should follow a waveform and a phase of the rectified voltage. As shown in FIG. 1, an average current Iavg of the input current Iin is controlled to be in a rectified sine wave to follow the waveform and the phase of the rectified voltage for improving the power factor of the circuit.

In prior art, the PFC circuit works with three operation modes for improving the circuit efficiency, i.e., Continuous Conduction Mode (CCM), Boundary Conduction Mode (BCM), and Discontinuous Conduction Mode (DCM). The operation mode of the PFC circuit is determined by a load condition of the PFC circuit. Generally, under heavy load condition, the PFC circuit operates in CCM; under light load condition, the PFC circuit operates in DCM; and when the load is between heavy and light, the PFC circuit operates in BCM. The waveforms of the input current Iin of the PFC circuit operating in CCM, BCM, and DCM are shown in FIG. 1.

SUMMARY OF THE INVENTION

According to an embodiment of the present invention, a power factor control circuit for a PFC circuit is provided. The power factor control circuit includes a control reference circuit and a switching control circuit. The control reference circuit receives a first current reference, a second current reference, and an input average current, and to provide a peak current signal, a valley current signal and a turn-on delay signal based thereon. The switching control circuit receives a current sense signal, the peak current signal, the valley current signal, and the turn-on delay signal, and to provide a switching control signal to control a dominant power switch of the PFC circuit based thereon. The current sense signal indicates a current flowing through an energy storage device of the PFC circuit. The input average current indicates an input current of the PFC circuit. When the input average current is larger than the first current reference, the PFC circuit operates in Continuous Conduction Mode (CCM). In that case, the dominant power switch is turned off when the current sense signal increases to the peak current signal, and turned on when the current sense signal decreases to the valley current signal. When the input average current is smaller than the first current reference and larger than the second current reference, the PFC circuit operates in Boundary Conduction Mode (BCM). In that case, the dominant power switch is turned off when the current sense signal increases to the peak current signal, and turned on when the current sense signal decreases to zero. When the input average current is smaller than the second current reference signal, the PFC circuit operates in Discontinuous Conduction Mode (DCM). In that case, the dominant power switch is turned off when the current sense signal increases to the peak current signal, and turned on after a time period from when the current sense signal decreases to zero. The time period is indicated by the turn-on delay signal.

According to another embodiment of the present invention, a PFC circuit is provided. The PFC circuit includes a converting circuit having a dominant power switch and a power factor control circuit. The converting circuit converts an input rectified voltage to an output voltage based on a switching control signal provided to the dominant power switch. The power factor control circuit provides the switching control signal. The PFC circuit operates in Continuous Conduction Mode (CCM) when an input average current is larger than a first current reference. In that case, the dominant power switch is turned off when a current sense signal increases to a peak current signal, and turned on when the current sense signal decreases to a valley current signal. The input average current indicates an input current of the PFC circuit. The current sense signal indicates a current flowing through an energy storage device of the converting circuit. The PFC circuit operates in Boundary Conduction Mode (BCM) when the input average current is smaller than the first current reference and larger than a second current reference. In that case, the dominant power switch is turned off when the current sense signal increases to the peak current signal, and turned on when the current sense signal decreases to zero, and the first current reference is larger than the second current reference. The PFC circuit operates in Discontinuous Conduction Mode (DCM) when the input average current is smaller than the second current reference signal. In that case, the dominant power switch is turned off when the current sense signal increases to the peak current signal, and turned on after a time period from when the current sense signal decreases to zero.

According to yet another embodiment of the present invention, a control method for controlling a PFC circuit is provided. A dominant power switch of the PFC circuit is turned off based on a comparison result of a current sense signal and a peak current signal. The dominant power switch of the PFC circuit is turned on based on a turn-on delay signal and a comparison result of the current sense signal and a valley current signal. The PFC circuit operates in Continuous Conduction Mode (CCM) when an input average current is larger than a first current reference. In that case, the dominant power switch is turned off when the current sense signal increases to the peak current signal, and turned on when the current sense signal decreases to the valley current signal. The input average current indicates an input current of the PFC circuit. The current sense signal indicates a current flowing through an energy storage device of the PFC circuit. The PFC circuit operates in Boundary Conduction Mode (BCM) when the input average current is smaller than the first current reference and larger than a second current reference. In that case, the dominant power switch is turned off when the current sense signal increases to the peak current signal, and turned on when the current sense signal decreases to zero. The first current reference is larger than the second current reference. The PFC circuit operates in Discontinuous Conduction Mode (DCM) when the input average current is smaller than the second current reference signal. In that case, the dominant power switch is turned off when the current sense signal increases to the peak current signal, and turned on after a time period from when the current sense signal decreases to zero. The time period is indicated by the turn-on delay signal.

BRIEF DESCRIPTION OF THE DRAWINGS

The present invention can be further understood with reference to the following detailed description and the appended drawings.

Figure 1:
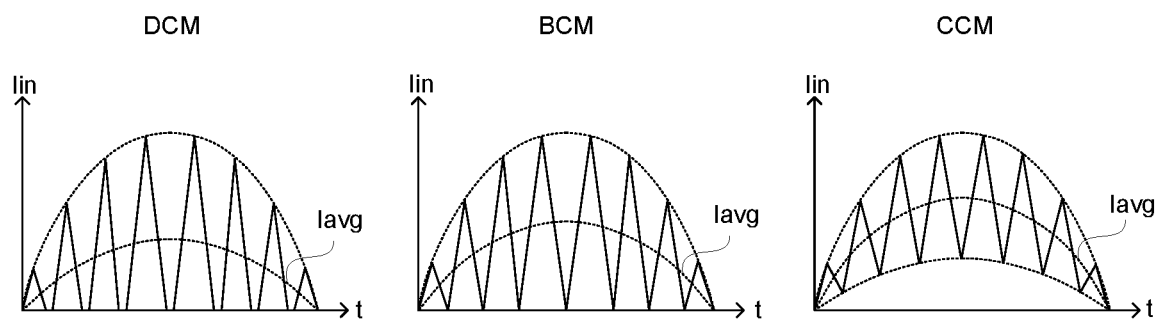
FIG. 1 shows waveforms of an input current Iin of a PFC circuit operating in different modes.

The use of the same reference label in different drawings indicates the same or like components.

DETAILED DESCRIPTION

Various embodiments of the present invention will be described in detail below, and it should be noted that the embodiments described here are only for illustration. However, the present invention is not limited thereto. In the following description, numerous specific details, such as example circuits and example values for these circuit components, and methods are illustrated in order to provide a thorough understanding of the present invention. It will be apparent for persons having ordinary skill in the art that the present invention can be practiced without one or more specific details, or with other methods, components, materials. In other instances, well-known circuits, materials or methods are not shown or described in detail in order to avoid obscuring the present invention.

Throughout this description, the phrases "in one embodiment", "in an embodiment", "in some embodiments", "in an example", "in some examples", "in one implementation", and "in some implementations" as used to include both combinations and sub-combinations of various features described herein as well as variations and modifications thereof. These phrases used herein does not necessarily refer to the same embodiment, although it may. Additionally, persons having ordinary skill in the art will appreciated that the drawings provided herein are for illustrative purposes and are not necessarily drawn to scale. The similar elements are provided with similar reference numerals. As used herein, the term "and/or" includes any combinations of one or more of the listed items.

Figure 2:
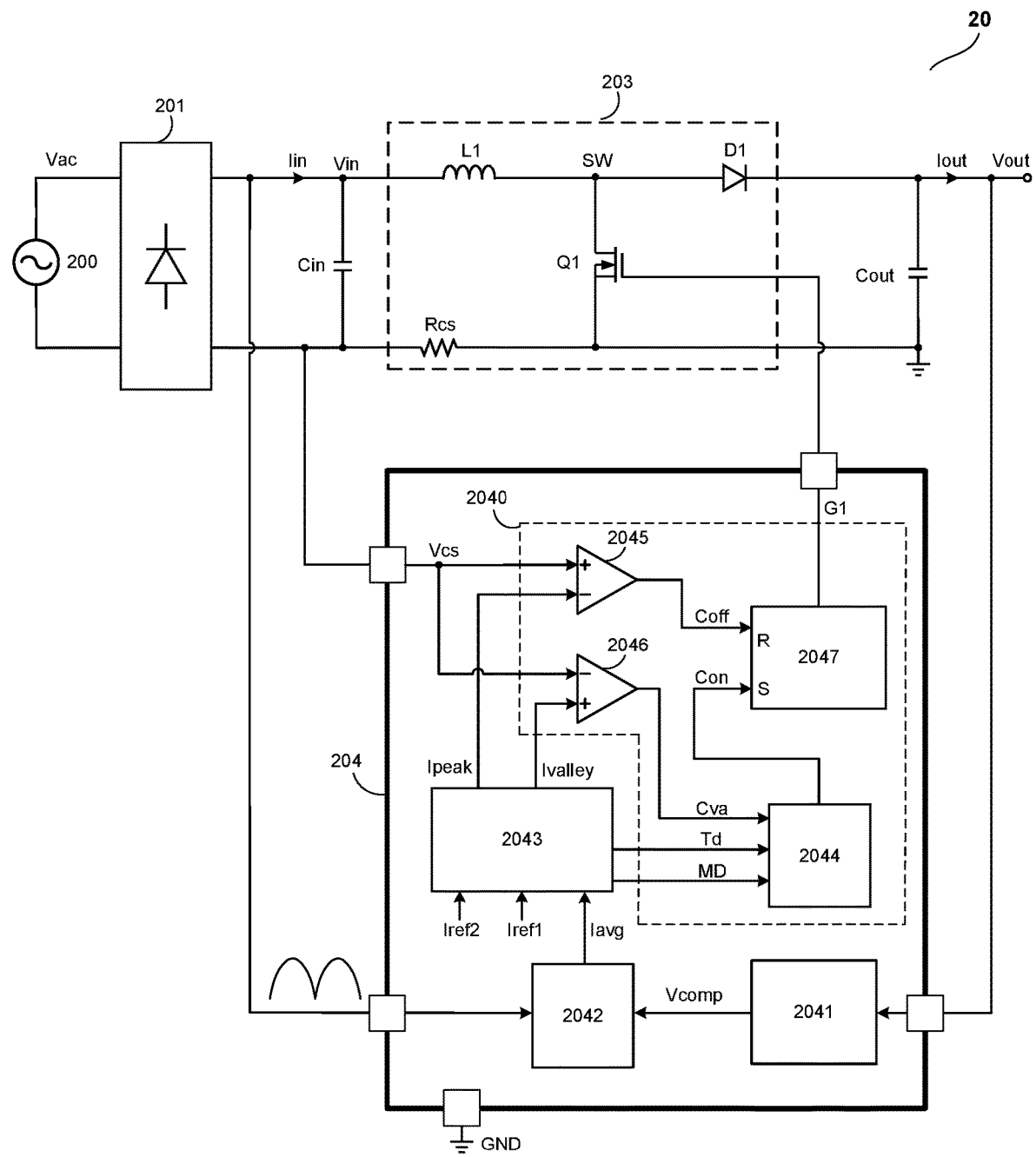
FIG. 2 schematically shows a PFC circuit 20 in accordance with an embodiment of the present invention.

FIG. 2 schematically shows a PFC circuit 20 in accordance with an embodiment of the present invention. The PFC circuit 20 includes a rectifying circuit 201, a converting circuit 203, and a power factor control circuit 204. The rectifying circuit 201 rectifies the AC voltage Vac provided by an AC power supply 200 to obtain a rectified voltage having a rectified sine wave, and the rectified voltage is filtered by an input capacitor Cin to obtain an input rectified voltage Vin, for powering the converting circuit 203. The converting circuit 203 has a BOOST topology including an inductor L1, a first switch Q1, and a second switch D1 connected as shown in FIG. 2, for converting the input rectified voltage Vin to an output voltage Vout that meets the requirements of the load (not shown). The power factor control circuit 204 is configured to receive the input rectified voltage Vin, a current sense signal Vcs indicative of the input current Iin, and the output voltage Vout, and to provide a switching control signal G1 to control the converting circuit 203 based on the input rectified voltage Vin, the current sense signal Vcs, and the output voltage Vout. In one embodiment, the power factor control circuit 204 is integrated in a chip. In some embodiments, the power factor control circuit 204 may be integrated with one or both of the first switch Q1 and the second switch D1 in a same chip.

In the embodiment shown in FIG. 2, the AC power supply 200 may be any AC power supplies, for example, power gird. The rectifying circuit 201 may include any suitable conventional rectifying circuits such as a full-bridge rectifying circuit, a half-bridge rectifying circuit, and the like.

In the embodiment shown in FIG. 2, the converting circuit 203 includes the inductor L1, the first switch Q1, and the second switch D1. The inductor L1 is coupled between the input rectified voltage Vin and a switching terminal SW. The first switch Q1 is coupled between the switching terminal SW and a ground reference GND. The second switch D1 is coupled between the switching terminal SW and the output voltage Vout. The first switch Q1 is turned on and off alternately with the second switch D1 in response to the switching control signal G1. An operation of the converting circuit 203 is described below. When the first switch Q1 is turned on, the AC power supply 200, the inductor L1, and the first switch Q1 form a loop. The input current Iin (i.e., the current flowing through the inductor L1) increases. Meanwhile an output capacitor Cout powers the load and maintains the output voltage Vout. When the first switch Q1 is turned off, the AC power supply 200, the inductor L1, the second switch D1, the output capacitor Cout, and the load form a loop. The input current Iin (i.e., the current flowing through the inductor L1) decreases. Meanwhile the input current Iin charges the output capacitor Cout to maintain the output voltage Vout. With the energy storage function of the inductor L1 and the output capacitor Cout, and by regulating the duty cycle of the first switch Q1, a desired value of the output voltage Vout could be obtained.

In the embodiment shown FIG. 2, the converting circuit 203 further includes a current detecting resistor Rcs coupled between the first switch Q1 and the input capacitor Cin. The current sense signal Vcs is generated by the input current Iin flowing through the current detecting resistor Rcs.

In the embodiment of FIG. 2, the converting circuit 203 has the BOOST topology. It should be appreciated that, the converting circuit 203 could be any other suitable topologies, for example, a BUCK topology, a BUCK-BOOST topology or a FLYBACK topology. In the BOOST topology of the embodiment of FIG. 2, the first switch Q1 is also referred as a dominant power switch, the second switch D1 is also referred as a subordinate power switch, the inductor L1 is an energy storage device. It should be appreciated that, when the topology of the converting circuit changes, positions of the power switches and the energy storage devices would be changed accordingly. For example, in the FLYBACK topology, the dominant power switch refers to a primary side switch, the subordinate power switch refers to a secondary side switch, and the energy storage device refers to a transformer. Generally, when the dominant power switch is turned on and the subordinate power switch is turned off, the energy storage device of the converting circuit starts to store energy; and when the dominant power switch is turned off and the subordinate power switch is turned on, the energy storage device of the converting circuit starts to release energy.

In the embodiment shown in FIG. 2, the power factor control circuit 204 includes a feedback circuit 2041, an input current reference circuit 2042, a control reference circuit 2043, and a switching control circuit 2040.

The feedback circuit 2041 is configured to receive the output voltage Vout, and to provide a feedback control signal Vcomp based on the output voltage Vout. In one embodiment, the feedback circuit 2041 includes an error amplifier circuit. The error amplifier circuit compares the output voltage Vout with an output voltage reference signal, and provides the feedback control signal Vcomp based on a comparison result of the output voltage Vout and the output voltage reference signal. Any suitable conventional circuits for generating the feedback control signal based on the output voltage Vout could be used in the present invention. It should be appreciated that, in some embodiments, when the output voltage Vout is higher than an upper limit of the input voltage range of the feedback circuit 2041, partial of the output voltage Vout may be provided to the feedback circuit 2041 by a dividing circuit.

In the embodiment of FIG. 2, the input current reference circuit 2042 is configured to receive the input rectified voltage Vin and the feedback control signal Vcomp, and to provide the input average current Iavg based on the input rectified voltage Vin and the feedback control signal Vcomp. A waveform of the input average current Iavg follows a waveform of the input rectified voltage Vin, and a value of the input average current Iavg is determined by the feedback control signal Vcomp and the input rectified voltage Vin, which could be expressed as:

$$Iavg(t) = \frac{Vcomp \times Vin(t)}{Vin\, pk^2} \quad (1)$$

wherein Iavg(t) represents a real-time value of the input average current Iavg, Vin(t) represents a real-time value of the input rectified voltage Vin, and Vinpk represents a peak value of the input rectified voltage Vin. As shown in equation (1), when the input rectified voltage Vin is determined (i.e., the AC voltage is determined), the value of the input average current Iavg is decided by the feedback control signal Vcomp. The feedback control signal Vcomp is indicative of the load, thus the value of the input average current Iavg reflects the load. When the feedback control signal Vcomp indicates that the value of the output voltage Vout increases, the value of the input average current Iavg decreases. When the feedback control signal Vcomp indicates that the value of the output voltage Vout decreases, the value of the input average current Iavg increases. The input current reference circuit 2042 could be realized by any suitable conventional circuits in the art.

In the embodiment of FIG. 2, the control reference circuit 2043 receives the input average current Iavg, a first current reference Iref1, and a second current reference Iref2, and provides a mode control signal MD, a peak current signal Ipeak, a valley current signal Ivalley, and an turn-on delay signal Td based on the comparison result of the input average current Iavg, the first current reference Iref1, and the second current reference Iref2. The mode control signal MD indicates operation modes of the PFC circuit 20, i.e., CCM, BCM and DCM.

In the embodiment of FIG. 2, the switching control circuit 2040 includes a turn-on control circuit 2044, a peak comparator 2045, a valley comparator 2046, and a driving circuit 2047.

The peak comparator 2045 receives the current sense signal Vcs and the peak current signal Ipeak, and provides a turn-off control signal Coff based on a comparison result of the current sense signal Vcs and the peak current signal Ipeak. The valley comparator 2046 receives the current sense signal Vcs and the valley current signal Ivalley, and provides a valley control signal Cva based on a comparison result of the current sense signal Vcs and the valley current signal Ivalley. The turn-on control circuit 2044 receives the valley control signal Cva, the mode control signal MD, and the turn-on delay signal Td, and provides a turn-on control signal Con. In CCM and BCM, a value of the turn-on delay signal Td is set to be zero. When the current sense signal Vcs decreases to the valley current signal Ivalley, the first switch Q1 is turned on by the turn-on control signal Con. In DCM, after a time period indicated by the turn-on delay signal Td past from when the current sense signal Vcs decreases to the valley current signal Ivalley, the first switch Q1 is turned on by the turn-on control signal Con.

The driving circuit 2047 receives the turn-off control signal Coff and the turn-on control signal Con, and provides the switching control signal G1 based on the turn-off control signal Coff and the turn-on control signal Con. When the turn-off control signal Coff indicates that the current sense signal Vcs increases to the peak current signal Ipeak, the first switch Q1 is turned off by the switching control signal G1. In CCM and BCM, when the current sense signal Vcs decreases to the valley current signal Ivalley, the first switch Q1 is turned on by the switching control signal G1. In DCM, after the time period indicated by the turn-on delay signal Td past from when the current sense signal Vcs decreases to the valley current signal Ivalley, the first switch Q1 is turned on by the switching control signal G1. In one embodiment, the driving circuit 2047 includes a RS flip-flop and a buffer circuit. The turn-off control signal Coff is provided to a reset terminal of the RS flip-flop, the turn-on control signal Con is provided to a set terminal of the RS flip-flop, and the RS flip-flop provides the switching control signal G1. The switching control signal G1 controls the first switch Q1 after its driving capability being enhanced by the buffer circuit.

In the embodiments of the present invention, the operation mode of the PFC circuit 20, values of the peak current signal Ipeak, the valley current signal Ivalley and the turn-on delay signal Td are determined by the load condition of the PFC circuit 20.

Figure 3:
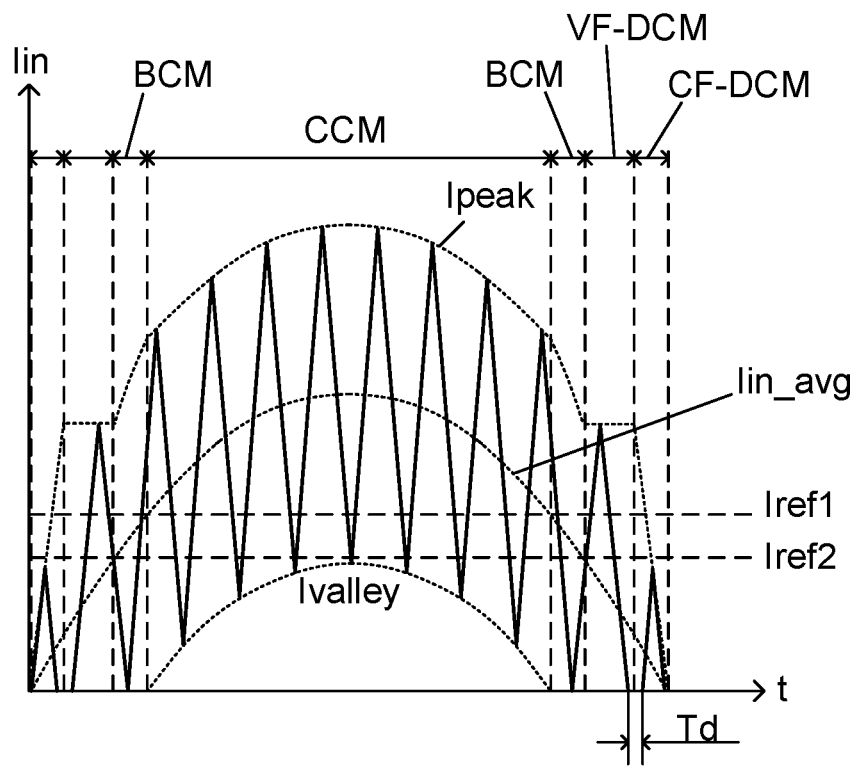
FIG. 3 schematically shows a waveform of the input current Iin of the PFC circuit 20 operating under heavy load condition in accordance with an embodiment of the present invention.

FIG. 3 schematically shows a waveform of the input current Iin when the PFC circuit 20 is operating under heavy load condition in accordance with an embodiment of the present invention. Under heavy load condition, a maximum value of the input average current Iavg is larger than the first current reference Iref1. FIG. 3 shows the waveform of the input current Iin in a single cycle for illustration purpose. As shown in FIG. 3, when the value of the input average current Iavg is larger than the first current reference Iref1, the mode control signal MD indicates that the PFC circuit 20 operates in CCM. When the value of the input average current Iavg is smaller than the first current reference Iref1, the mode control signal MD indicates that the PFC circuit 20 operates in DCM. When the value of the input average current Iavg is between the first current reference Iref1 and the second current reference Iref2, the mode control signal MD indicates that the PFC circuit 20 operates in BCM. Persons having ordinary skill in the art could set the first current reference Iref1 and the second current reference Iref2 according to the specs and requirements of applications.

In the embodiment of the FIG. 3, when the PFC circuit 20 operates in CCM, the ripple of the input current Iin is fixed. The value of the peak current signal Ipeak is set to be Ipeak=Iavg+Iref1. The value of the valley current signal Ivalley is set to be Ivalley=Iavg−Iref1. When the first switch Q1 is turned on, the power supply is coupled to the inductor L1 to charge the inductor L1, and the input current Iin increases. When the input current Iin increases to the peak current signal Ipeak, the peak comparator 2045 provides the turn-off control signal Coff to reset the driving circuit 2047, and thus the driving circuit 2047 provides the switching control signal G1 to turn off the first switch Q1. As a result, the input current Iin flows through the second switch D1 and charges the output capacitor Cout, and meanwhile the input current Iin decreases. When the input current Iin decreases to the valley current signal Ivalley, the valley comparator 2046 provides the turn-on control signal Con to turn on the first switch Q1, then the input current Iin increases again, and the operation repeats.

In the embodiment of the FIG. 3, when the PFC circuit 20 operates in BCM, the valley current signal Ivalley is set to be zero, the value of the peak current signal Ipeak is set to be twice the input average current Iavg, i.e., Ipeak=2×Iavg. When the first switch Q1 is turned on, the power supply is coupled to the inductor L1 to charge the inductor L1, and the input current Iin increases. When the input current Iin increases to the peak current signal Ipeak, the peak comparator 2045 provides the turn-off control signal Coff to reset the driving circuit 2047, and thus the driving circuit 2047 provides the switching control signal G1 to turn off the first switch Q1. As a result, the input current Iin flows through the second switch D1 and charges the output capacitor Cout, and meanwhile the input current Iin decreases. When the input current Iin decreases to zero, the valley comparator 2046 provides the turn-on control signal Con to turn on the first switch Q1, then the input current Iin increases again, and the operation repeats.

In the embodiment of the FIG. 3, DCM includes two types: Variable Frequency-Discontinuous Conduction Mode (VF-DCM) and Constant Frequency-Discontinuous Conduction Mode (CF-DCM).

When the PFC circuit 20 operates in VF-DCM, the valley current signal Ivalley is set to be zero, the value of the peak current signal Ipeak is set to be twice the second current reference Iref2, i.e., Ipeak=2×Iref2, and the value of the turn-on delay signal Td could be expressed as:

$$Td = \frac{2 \times Iref1 \times (Ton + Toff)}{Iavg} - Ton - Toff \quad (2)$$

wherein the turn-on time Ton is a time period starts from the time when the first switch Q1 is turned on and ends at the time when the second switch D1 is turned off, and the turn-off time Toff is a time period starts from the time when the first switch Q1 is turned off and ends at the time when the second switch D1 is turned on. In one embodiment, the power factor control circuit 204 records the on times of the first switch Q1 and the second switch D1 every switching period respectively and stores the on times in register(s) to obtain the turn-on time Ton and the turn-off time Toff. In one embodiment, the power factor control circuit 204 includes a timing circuit to respectively timing logic level durations of the turn-on control signal Con and the turn-off control signal Coff, wherein the logic level durations are associated with the on/off states of the first switch Q1 and the second switch D1.

When the first switch Q1 is turned on, the power supply is coupled to the inductor L1 to charge the inductor L1, the input current Iin increases. When the input current Iin increases to the peak current signal Ipeak, the peak comparator 2045 provides the turn-off control signal Coff to reset the driving circuit 2047, and thus the driving circuit 2047 provides the switching control signal G1 to turn off the first switch Q1. As a result, the input current Iin flows through the second switch D1 and charges the output capacitor Cout, and meanwhile the input current Iin decreases. After the time period indicated by the turn-on delay signal Td past from when the input current Iin decreases to zero, the turn-on control circuit 2044 provides the turn-on control signal Con to turn on the first switch Q1, then the input current Iin increases again, and the operation repeats.

In VF-DCM, when a load of the PFC circuit 20 decreases, a working frequency of the PFC circuit 20 decreases accordingly. When the working frequency decreases to a minimum switching frequency fmin, the PFC circuit 20 enters into CF-DCM. In CF-DCM, the working frequency of the PFC circuit 20 is fixed at the minimum switching frequency fmin, which means a switching frequency of the first switch Q1 is fixed at the minimum switching frequency fmin. In CF-DCM, the value of the peak current signal Ipeak could be expressed as:

$$Ipeak = \frac{2 \times Iavg}{(Ton + Toff) \times f\min} \quad (3)$$

The value of the turn-on delay signal Td could be expressed as:

$$Td = \frac{1}{fmin} - Ton - Toff \quad (4)$$

The value of the minimum switching frequency fmin could be set according to application requirements. In one embodiment, the value of the minimum switching frequency fmin could be set to be higher than an upper limit of the audio frequency range, to avoid the working frequency of the PFC circuit 20 falling into the audio frequency range, which may generate noise.

Compared with VF-DCM, in CF-DCM, the values of the peak current signal Ipeak and the turn-on delay signal Td are associated with the minimum switching frequency fmin. The working process of the PFC circuit 20 in the CF-DCM is similar to that in VF-DCM. When the first switch Q1 is turned on, the input current Iin increases. When the input current Iin increases to the peak current signal Ipeak, the peak comparator 2045 provides the turn-off control signal Coff to reset the driving circuit 2047, and thus the driving circuit 2047 provides the switching control signal G1 to turn off the first switch Q1. As a result, the input current Iin flows through the second switch D1 and charges the output capacitor Cout, and meanwhile the input current Iin decreases. After the time period indicated by the turn-on delay signal Td past from when the input current Iin decreases to zero, the turn-on control circuit 2044 provides the turn-on control signal Con to turn on the first switch Q1, then the input current Iin increases again, and the operation repeats.

It should be appreciated that, the values of the peak current signal Ipeak and the valley current signal Ivalley provided above are just for illustration purpose. In other embodiments of the present invention, the values of the peak current signal Ipeak and the valley current signal Ivalley could be set to other values. For example, in some embodiments, a switching frequency of the dominant power switch is fixed, the values of the peak current signal Ipeak and the valley current signal Ivalley could be set based on the fixed switching frequency and the input average current.

Figure 4:
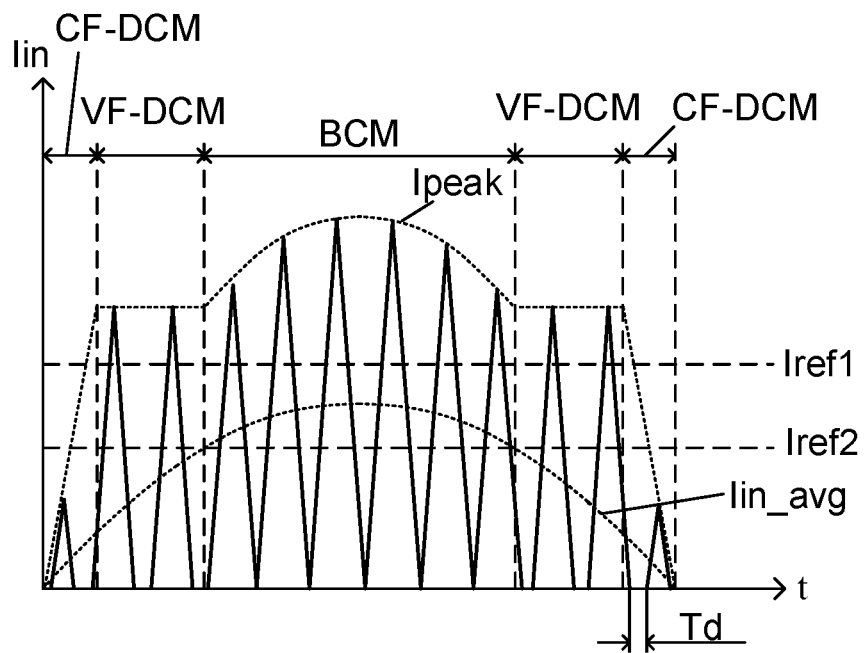
FIG. 4 schematically shows a waveform of the input current Iin of the PFC circuit 20 operating under medium load condition in accordance with an embodiment of the present invention.

FIG. 4 schematically shows a waveform of the input current Iin of the PFC circuit 20 operating under medium load condition in accordance with an embodiment of the present invention. Under medium load condition, the maximum value of the input average current Iavg is smaller than the first current reference Iref1 and larger than the second current reference Iref2. In FIG. 4, when the value of the input average current Iavg is smaller than the first current reference Iref1 and meanwhile larger than the second current reference Iref2, the PFC circuit 20 operates in BCM. When the value of the input average current Iavg is smaller than the second current reference Iref2, the PFC circuit 20 operates in DCM.

In the embodiment of FIG. 4, when the PFC circuit 20 operates in BCM and DCM, the values of the valley current signal Ivalley, the peak current signal Ipeak, and the turn-on delay signal Td, and the working process of the PFC circuit 20 are similar to those in the embodiment of FIG. 3 and will not be repeated here for brevity.

Figure 5:
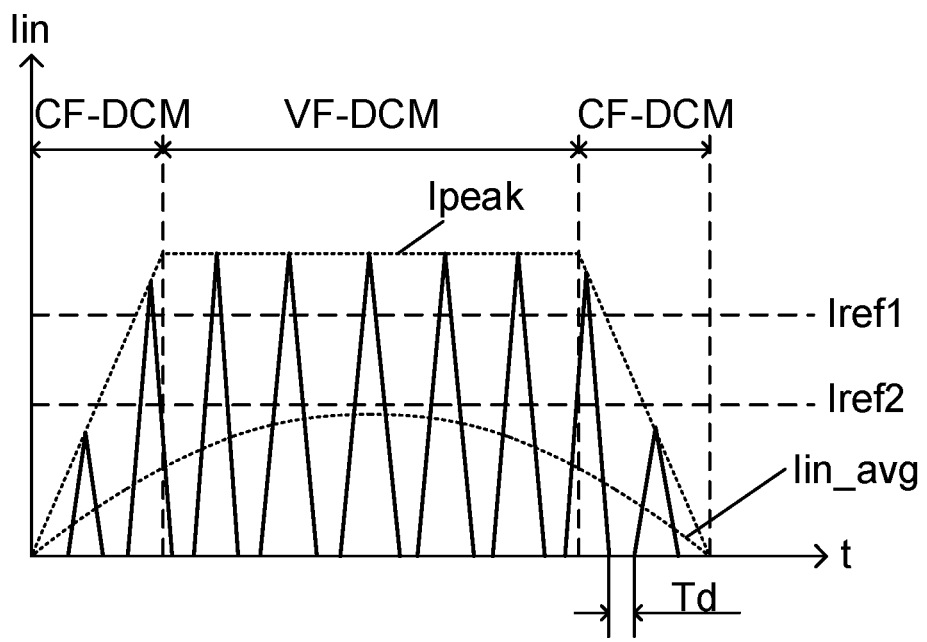
FIG. 5 schematically shows a waveform of the input current Iin of the PFC circuit 20 operating under light load condition in accordance with an embodiment of the present invention.

FIG. 5 schematically shows a waveform of the input current Iin of the PFC circuit 20 operating under light load condition in accordance with an embodiment of the present invention. Under light load condition, the maximum value of the input average current Iavg is smaller than the second current reference Iref2, the PFC circuit 20 operates in DCM.

In the embodiment of FIG. 5, DCM includes two types: VF-DCM and CF-DCM. When the PFC circuit 20 operates in VF-DCM and CF-DCM, the values of the valley current signal Ivalley, the peak current signal Ipeak, and the turn-on delay signal Td, and the working process of the PFC circuit are similar to those in the embodiment of FIG. 3 and will not be repeated here for brevity.

In the embodiments of the present invention, the control reference circuit 2043 for providing the valley current signal Ivalley, the peak current signal Ipeak, and the turn-on delay signal Td could be realized by a digital circuit. The relationship of the valley current signal Ivalley, the peak current signal Ipeak, the turn-on delay signal Td, and the first current reference Iref1, the second current reference Iref2, the input average current Iavg, and the minimum switching frequency fmin could be described by a digital language, to generate the digital circuit automatically to realize the control reference circuit 2043.

In the embodiments of the present invention, the turn-on control circuit 2044 receives the valley control signal Cva, the mode control signal MD, and the turn-on delay signal Td. When the mode control signal MD indicates that the PFC circuit 20 operates in CCM or BCM, the turn-on control circuit 2044 provides the valley control signal Cva as the turn-on control signal Con. When the mode control signal MD indicates that the PFC circuit 20 operates in DCM, the turn-on control circuit 2044 starts timing from the moment the valley control signal Cva indicates that the current sense signal Vcs decreases to the valley current signal Ivalley (i.e., 0). When the timing duration reaches the time period indicated by the turn-on delay signal Td, the turn-on control circuit 2044 provides the turn-on control signal Con to turn on the first switch Q1. In one embodiment, the turn-on control circuit 2044 could be realized by a digital circuit. In other words, functions and working process of the turn-on control circuit 2044 could be described by a digital language to generate the digital circuit automatically.

In the embodiments of FIGS. 3-5, in a single cycle of the input rectified voltage Vin, the operation mode of the PFC circuit 20 is determined by the input average current Iavg. When the maximum value of the input average current Iavg is larger than the first current reference Iref1, the operation mode of the PFC circuit 20 includes CCM, BCM and DCM. When the maximum value of the input average current Iavg is between the first current reference Iref1 and the second current reference Iref2, the operation mode of the PFC circuit 20 includes BCM and DCM. When the maximum value of the input average current Iavg is smaller than the second current reference Iref2, the operation mode of the PFC circuit 20 includes DCM. In the embodiments of FIGS. 3-5, the DCM includes VF-DCM and CF-DCM. In other embodiments, the DCM may include VF-DCM or CF-DCM.

In one embodiment, the mode control signal MD may have different levels for indicating different operation modes, for example, the mode control signal MD at high level indicates CCM, at low level indicates DCM, and at high impedance level indicates BCM. In other embodiments, the mode control signal MD may be a digital signal with multiple digits, for example, 00 may indicate CCM, 11 may indicate DCM, 01 may indicate BCM, et. al. It should be appreciated that, the mode control signal MD may adopt other suitable signal forms to indicate difference operation modes.

In the embodiment of FIG. 2, the first switch Q1 is implemented by a MOSFET and the second switch D1 is implemented by a diode. It should be appreciated that, the first switch Q1 could be implemented by other suitable controllable switches, and the second switch D1 could be implemented by a suitable controllable switch (e.g., MOSFET) instead of the diode. When the second switch is implemented by the controllable switch, the switching control signal G1 could also be used to control the second switch D1.

In one embodiment, the values of the first current reference Iref1, the second current reference Iref2, and the minimum switching frequency fmin could be set via a register. In some embodiments, the values of the first current reference Iref1, the second current reference Iref2, and the minimum switching frequency fmin could be set through the off-chip devices, for example, a resistor and/or a capacitor et. al.

Figure 6:
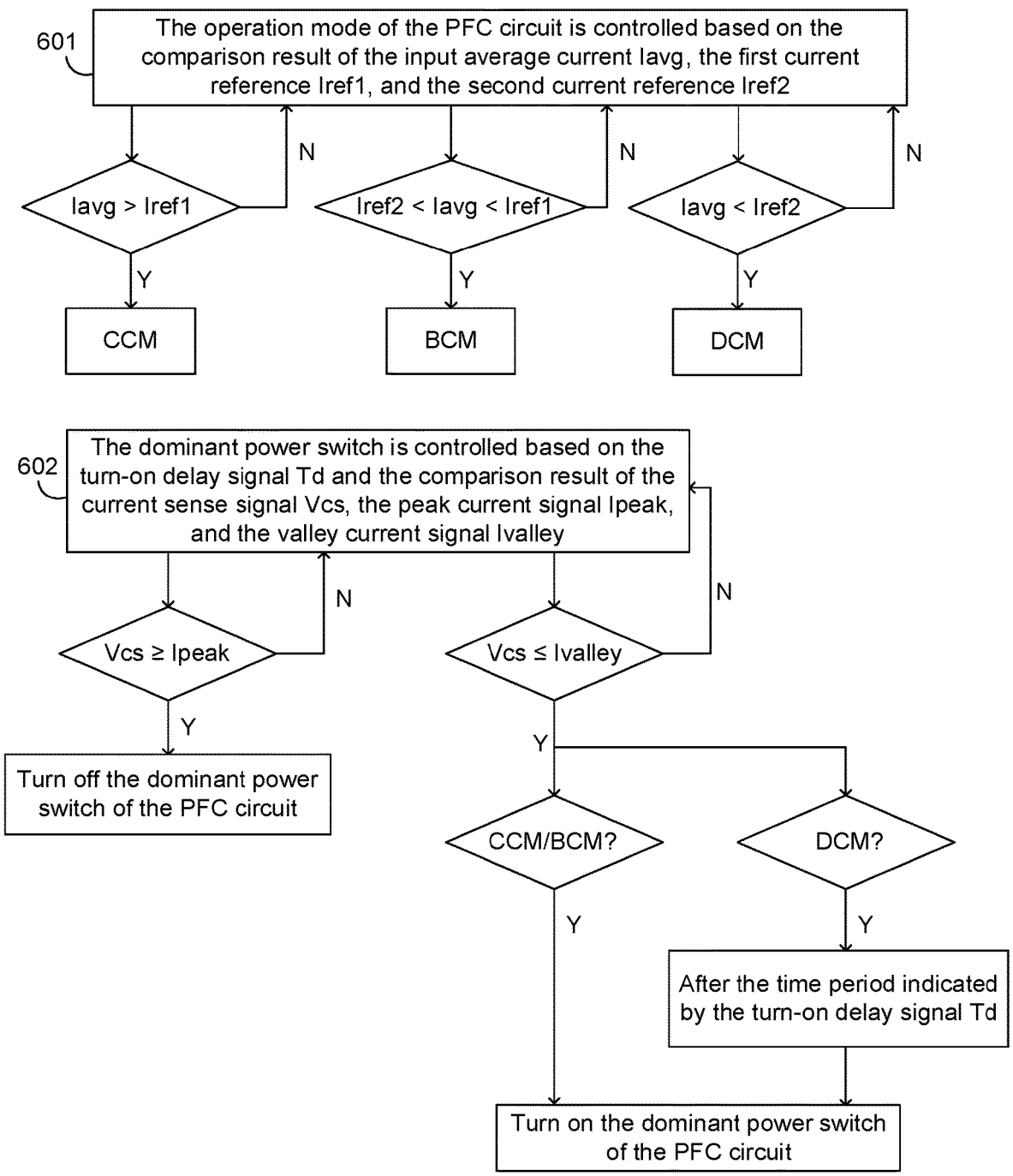
FIG. 6 schematically shows a flowchart of a power factor control method 60 for controlling a PFC circuit in accordance with an embodiment of the present invention.

FIG. 6 schematically shows a flowchart of a power factor control method 60 for controlling a PFC circuit in accordance with an embodiment of the present invention. The PFC circuit may include the converting circuit 203 having the BOOST topology shown in FIG. 2, and may include the converting circuit having other topologies too. The power factor control method 60 includes steps 601-602.

In step 601, the operation mode of the PFC circuit is controlled based on a comparison result of an input average current Iavg, a first current reference Iref1, and a second current reference Iref2. The PFC circuit operates in CCM when a value of the input average current Iavg is larger than the first current reference Iref1. The PFC circuit operates in BCM when the value of the input average current Iavg is smaller than the first current reference Iref1 and meanwhile larger than the second current reference Iref2, wherein the first current reference is larger than the second current reference. The PFC circuit operates in DCM when the value of the input average current Iavg is smaller than the second current reference Iref2.

In step 602, a dominant power switch of the PFC circuit is controlled based on a turn-on delay signal Td and a comparison result of a current sense signal Vcs, a peak current signal Ipeak, a valley current signal Ivalley, wherein the current sense signal Vcs indicates an input current Iin of the PFC circuit. The dominant power switch is turned off when the current sense signal Vcs increases to the peak current signal Ipeak. When the PFC circuit operates in CCM and BCM, the dominant power switch is turned on when the current sense signal Vcs decreases to the valley current signal Ivalley. When the PFC circuit operates in DCM, the dominant power switch is turned on after a time period past from when the current sense signal Vcs decreases to the valley current signal Ivalley, wherein the time period is indicated by the turn-on delay signal Td.

In one embodiment, in CCM, a difference between the peak current signal and the valley current signal is set to be constant.

In one embodiment, in CCM, a value of the peak current signal equals to the sum of the first current reference and the input average current, a value of the valley current signal equals to a difference between the first current reference and the input average current.

In one embodiment, in BCM, the value of the peak current signal is set to be twice the input average current.

In one embodiment, in BCM, the value of the valley current signal is set to be zero, the value of the peak current signal is set to be twice the input average current.

In one embodiment, in DCM, the difference between the peak current signal and the valley current signal is set to be constant.

In one embodiment, in DCM, the valley current signal is set to be zero, the value of the peak current signal is set to be twice the second current reference, a value of the turn-on delay signal is set according to equation (2).

In one embodiment, in DCM, a switching frequency of the dominant power switch is set to be a constant minimum switching frequency, the valley current signal is set to be zero, the value of the peak current signal is set according to equation (3), the value of the turn-on delay signal is set according to equation (4).

In one embodiment, the DCM includes two types: VF-DCM and CF-DCM. In VF-DCM, the peak current signal is set to be twice the second current reference, the value of the turn-on delay signal is set according to equation (2). In CF-DCM, the switching frequency of the dominant power switch is set to be the constant minimum switching frequency, the value of the valley current signal is set to be zero, the value of the peak current signal is set according to equation (3), the value of the turn-on delay signal is set according to equation (4).

In one embodiment, the power factor control method further includes: providing a feedback control signal to indicate a load condition of the PFC circuit based on an output voltage of the PFC circuit; and providing the input average current based on the feedback control signal and an input rectified voltage. The input rectified voltage is obtained by rectifying an AC voltage through a rectifying circuit. The input average current is proportional to the product of the feedback control signal and the real-time value of the input rectified voltage, and inversely proportional to the square of the peak value of the input rectified voltage.

It should be understood, the circuit and the workflow provided in the present invention are just for schematic illustration. Any circuits could realize the function and operation of the present invention does not depart from the spirit and the scope of the invention.

Although the invention has been described with reference to several exemplary embodiments, it should be understood that by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. A power factor control circuit for controlling a Power Factor Correction (PFC) circuit, the power factor control circuit comprising:
a control reference circuit configured to receive a first current reference, a second current reference, and an input average current, and to provide a peak current signal, a valley current signal and a turn-on delay signal based on the first current reference, the second current reference, and the input average current, wherein the first current reference is larger than the second current reference; and
a switching control circuit configured to receive a current sense signal, the peak current signal, the valley current signal, and the turn-on delay signal, and to provide a switching control signal to control a dominant power switch of the PFC circuit based on the current sense signal, the peak current signal, the valley current signal, and the turn-on delay signal, wherein the current sense signal indicates a current flowing through an energy storage device of the PFC circuit;
wherein the input average current indicates an input current of the PFC circuit, and wherein:
when the input average current is larger than the first current reference, the PFC circuit operates in Continuous Conduction Mode (CCM), the dominant power switch is turned off when the current sense signal increases to the peak current signal, and turned on when the current sense signal decreases to the valley current signal;
when the input average current is smaller than the first current reference and larger than the second current reference, the PFC circuit operates in Boundary Conduction Mode (BCM), the dominant power switch is turned off when the current sense signal increases to the peak current signal, and turned on when the current sense signal decreases to zero; and
when the input average current is smaller than the second current reference signal, the PFC circuit operates in Discontinuous Conduction Mode (DCM), the dominant power switch is turned off when the current sense signal increases to the peak current signal, and turned on after a time period from when the current sense signal decreases to zero, wherein the time period is indicated by the turn-on delay signal.

2. The power factor control circuit of claim 1, wherein the control reference circuit further provides a mode control signal indicative of an operation mode of the PFC circuit, and the switching control circuit comprises:
- a peak comparator configured to receive the current sense signal and the peak current signal, and to provide a turn-off control signal to turn off the dominant power switch based on a comparison result of the current sense signal and the peak current signal;
- a valley comparator configured to receive the current sense signal and the valley current signal, and to provide a valley control signal based on a comparison result of the current sense signal and the valley current signal; and
- a turn-on control circuit configured to receive the valley control signal, the mode control signal, and the turn-on delay signal, and to provide a turn-on control signal to turn on the dominant power switch of the PFC circuit based on the valley control signal, the mode control signal, and the turn-on delay signal.

3. The power factor control circuit of claim 1, wherein when in CCM, a value of the peak current signal equals to a sum of the first current reference and the input average current, and a value of the valley current signal equals to a difference between the first current reference and the input average current.

4. The power factor control circuit of claim 1, wherein when in BCM, a value of the peak current signal is twice the input average current, a value of the valley current signal is zero.

5. The power factor control circuit of claim 1, wherein when in DCM, a difference between the peak current signal and the valley current signal is constant.

6. The power factor control circuit of claim 5, wherein DCM comprises:
- a Variable Frequency-Discontinuous Conduction Mode (VF-DCM), wherein when in VF-DCM, a value of the peak current signal is twice the second current reference, and a value of the valley current signal is zero; and
- a Constant Frequency-Discontinuous Conduction Mode (CF-DCM), wherein when in CF-DCM, a switching frequency of the dominant power switch maintains a constant minimum switching frequency, and the value of the valley current signal is zero.

7. The power factor control circuit of claim 1, further comprising:
- a feedback circuit configured to receive an output voltage of the PFC circuit, and to provide a feedback control signal indicative of a load condition of the PFC circuit based on the output voltage.

8. The power factor control circuit of claim 7, further comprising:
- an input current reference circuit configured to receive the feedback control signal and an input rectified voltage, and to provide the input average current based on the feedback control signal and the input rectified voltage; wherein the input rectified voltage is a voltage obtained by rectifying an AC voltage through a rectifying circuit; and wherein the input average current is proportional to a product of the feedback control signal and a real-time value of the input rectified voltage, and inversely proportional to a square of a peak value of the input rectified voltage.

9. A PFC circuit, comprising:
- a converting circuit having a dominant power switch, wherein the converting circuit converts an input rectified voltage to an output voltage based on a switching control signal provided to the dominant power switch; and
- a power factor control circuit configured to provide the switching control signal;

wherein:
- the PFC circuit operates in Continuous Conduction Mode (CCM) when an input average current is larger than a first current reference, the dominant power switch is turned off when a current sense signal increases to a peak current signal, and turned on when the current sense signal decreases to a valley current signal, wherein the input average current indicates an input current of the PFC circuit, and the current sense signal indicates a current flowing through an energy storage device of the converting circuit;
- the PFC circuit operates in Boundary Conduction Mode (BCM) when the input average current is smaller than the first current reference and larger than a second current reference, the dominant power switch is turned off when the current sense signal increases to the peak current signal, and turned on when the current sense signal decreases to zero, wherein the first current reference is larger than the second current reference; and
- the PFC circuit operates in Discontinuous Conduction Mode (DCM) when the input average current is smaller than the second current reference signal, the dominant power switch is turned off when the current sense signal increases to the peak current signal, and turned on after a time period from when the current sense signal decreases to zero.

10. The PFC circuit of claim 9, wherein the power factor control circuit comprises:
- a control reference circuit configured to receive the first current reference, the second current reference, and the input average current, and to provide the peak current signal, the valley current signal and a turn-on delay signal based on the first current reference, the second current reference, and the input average current; and
- a switching control circuit configured to receive the current sense signal, the peak current signal, the valley current signal, and the turn-on delay signal, and to provide the switching control signal to control the dominant power switch of the PFC circuit based on the current sense signal, the peak current signal, the valley current signal, and the turn-on delay signal.

11. The PFC circuit of claim 10, wherein the control reference circuit is further configured to provide a mode control signal indicative of an operation mode of the PFC circuit, and the switching control circuit comprises:
- a peak comparator configured to receive the current sense signal and the peak current signal, and to provide a turn-off control signal to turn off the dominant power switch based on a comparison result of the current sense signal and the peak current signal;
- a valley comparator configured to receive the current sense signal and the valley current signal, and to provide a valley control signal based on a comparison result of the current sense signal and the valley current signal; and
a turn-on control circuit configured to receive the valley control signal, the mode control signal, and the turn-on delay signal, and to provide a turn-on control signal to turn on the dominant power switch of the PFC circuit based on the valley control signal, the mode control signal, and the turn-on delay signal.

12. The PFC circuit of claim 9, wherein:
when the PFC circuit operates in CCM, a value of the peak current signal equals to a sum of the first current reference and the input average current, and a value of the valley current signal equals to a difference between the first current reference and the input average current;
when the PFC circuit operates in BCM, the value of the peak current signal is twice the input average current, the value of the valley current signal is zero; and
when the PFC circuit operates in DCM, a difference between the peak current signal and the valley current signal is constant.

13. The PFC circuit of claim 12, wherein DCM comprises:
a Variable Frequency-Discontinuous Conduction Mode (VF-DCM), wherein when the PFC circuit operates in VF-DCM, the value of the peak current signal is twice the second current reference, the value of the valley current signal is zero; and
a Constant Frequency-Discontinuous Conduction Mode (CF-DCM), wherein when the PFC circuit operates in CF-DCM, a switching frequency of the dominant power switch maintains a constant minimum switching frequency, the value of the valley current signal is zero.

14. The PFC circuit of claim 9, wherein the dominant power switch of the converting circuit is coupled between a switching terminal of the converting circuit and a ground reference, the energy storage device of the converting circuit is coupled between an input terminal of the converting circuit and the switching terminal, and wherein the converting circuit further comprises:
a subordinate power switch coupled between the switching terminal and an output terminal of the converting circuit.

15. A power factor control method for controlling a PFC circuit, comprising:
turning off a dominant power switch of the PFC circuit based on a comparison result of a current sense signal and a peak current signal; and
turning on the dominant power switch of the PFC circuit based on a turn-on delay signal and a comparison result of the current sense signal and a valley current signal;
wherein:
the PFC circuit operates in Continuous Conduction Mode (CCM) when an input average current is larger than a first current reference, the dominant power switch is turned off when the current sense signal increases to the peak current signal, and turned on when the current sense signal decreases to the valley current signal, and wherein the input average current indicates an input current of the PFC circuit, and the current sense signal indicates a current flowing through an energy storage device of the PFC circuit;
the PFC circuit operates in Boundary Conduction Mode (BCM) when the input average current is smaller than the first current reference and larger than a second current reference, the dominant power switch is turned off when the current sense signal increases to the peak current signal, and turned on when the current sense signal decreases to zero, wherein the first current reference is larger than the second current reference; and
the PFC circuit operates in Discontinuous Conduction Mode (DCM) when the input average current is smaller than the second current reference signal, the dominant power switch is turned off when the current sense signal increases to the peak current signal, and turned on after a time period from when the current sense signal decreases to zero, wherein the time period is indicated by the turn-on delay signal.

16. The power factor control method of claim 15, wherein when in CCM, a value of the peak current signal equals to a sum of the first current reference and the input average current, and a value of the valley current signal equals to a difference between the first current reference and the input average current.

17. The power factor control method of claim 15, wherein when in BCM, a value of the peak current signal is twice the input average current, a value of the valley current signal is zero.

18. The power factor control method of claim 15, wherein when in DCM, a difference between the peak current signal and the valley current signal is constant.

19. The power factor control method of claim 18, wherein DCM comprises:
a Variable Frequency-Discontinuous Conduction Mode (VF-DCM), wherein when the PFC circuit operates in VF-DCM, a value of the peak current signal is twice the second current reference, a value of the valley current signal is zero; and
a Constant Frequency-Discontinuous Conduction Mode (CF-DCM), wherein when the PFC circuit operates in CF-DCM, a switching frequency of the dominant power switch maintains a constant minimum switching frequency, the value of the valley current signal is zero.

20. The power factor control method of claim 15, further comprising:
providing a feedback control signal indicative of a load condition of the PFC circuit based on an output voltage of the PFC circuit; and
providing the input average current based on the feedback control signal and an input rectified voltage;
wherein the input rectified voltage is obtained by rectifying an AC voltage through a rectifying circuit; and
wherein the input average current is proportional to a product of the feedback control signal and a real-time value of the input rectified voltage, and inversely proportional to a square of a peak value of the input rectified voltage.

* * * * *